3,300,419
PHENOLIC RESIN CELLULAR MATERIALS
AND METHOD FOR MAKING SAME
Paul N. Erickson, Birmingham, Mich., assignor to Evans Products Company, Plymouth, Mich., a corporation of Delaware
No Drawing. Filed July 15, 1963, Ser. No. 295,244
12 Claims. (Cl. 260—2.5)

The present invention relates to improved compositions for forming self-sustaining phenolic resin materials and to a method of making articles consisting solely of said cellular materials or composite articles which include components encased by said cellular materials.

This invention is particularly concerned with compositions which are improved in the respect that they provide controllable pot life periods of sufficient duration to enable extensive handling and application procedures prior to the initiation of foaming. Such lengthened pot life substantially increases the field of use and types of applications in which such compositions have utility. This invention also contemplates the provision of compositions of the above described type which have remarkably improved flame resistance and substantial improvement and resistance to flameless decomposition from sustained high temperature heat relative to heretofore known cellular phenolic resin materials.

In accordance with this invention is has been found that flowable, acid curing, thermosetting phenol aldehyde A-stage or B-stage condensation products may be caused to foam and produce self-sustaining cellular materials by the addition thereto of certain quantities of ferric chloride·$6H_2O$. It has also been found that the combination of such phenol aldehyde condensation products and ferric chloride·$6H_2O$ is modified to enable the formation of flame resistant, self-sustaining cellular materials by incorporating in such a mixture certain proportions of aluminum chloride·$6H_2O$. The degree of foaming and thus the density of the ultimate cellular material can be varied by incorporating in the mixture controlled quantities of a volatilizable hydrocarbon, and the pore size and foam structure additionally modified by incorporating controlled quantities of certain types of wetting agents in the mixture. By controlling the degree of preliminary polymerization of the phenol aldehyde components, or the aging thereof at temperatures above about 75° F. to thereby modify the viscosity characteristics of the condensation product, a series of varying density cellular materials can be produced. Moreover, the desired flame resistance and the sustained high temperature heat resistance which is desired for the intended end use as well as the pot life and foaming characteristics can be further controlled, and preliminarily adjusted to produce a wide range of suitable application procedures and final properties in the resultant cellular material, as will be explained more fully hereinafter.

Broadly stated, the compositions of this invention which are suitable to provide the above described materials contain, in parts by weight:

FORMULATION I

| | Parts by weight |
|---|---|
| Phenol-aldehyde resin | 100 |
| Ferric chloride·$6H_2O$ | 5–35 |
| Aluminum chloride | 0–100 |
| Volatilizable hydrocarbon | 0–6 |
| Wetting agent | 0–10 |

A preferred composition for the purposes of this invention contains in parts by weight:

FORMULATION II

| | Parts by weight |
|---|---|
| Phenol formaldehyde resin | 100 |
| Ferric chloride·$6H_2O$ | 8–15 |
| Aluminum chloride | 15–50 |
| Volatilizable hydrocarbon | 2–6 |
| Wetting agent | 1–4 |

A composition which exhibits unusually desirable pot life characteristics and which forms cellular material having substantially improved flame and heat resistance characteristics contains, in parts by weight:

FORMULATION III

| | Parts by weight |
|---|---|
| Phenol formaldehyde | 100 |
| Ferric chloride·$6H_2O$ | 13 |
| Aluminum chloride | 20 |
| Volatilizable hydrocarbon | 3 |
| Wetting agent | 2 |

The compositions of Formulations I, II and III may be further modified to include additional components such as about 1%–5% antimony oxide, about 1% to about 10% amorphous carbon black, about 1%–20% graphite and about 1% to about 5% of one or more chlorinated hydrocarbons having a specific gravity in the range of about 1.2 to about 1.65, a distillation range of about 320° C. to about 400° C. and an acidity of about 0.01 to about 0.02 mg. of KOH/gram of chlorinated hydrocarbon, which hydrocarbons are available commercially under the trademark Arochlor. Additional components for purposes of providing color or functioning as an inert filler may be present, such, for example, as kaolin or other clay materials, powdered mica, quartz, finely divided silicon dioxide, etc. All of the percentage quantities of the above specified additional components are given in weight percent, based on the aqueous resinous mass to which they are added.

The phenol aldehyde resin which is useful for the purposes of this invention is a foam forming resin which is flowable or pourable under normal temperature and pressure conditions, and is a composition which contains an aqueous acid-curing thermosetting liquid phenolic resin, the resin being an A-stage resinous product of partial reaction of ingredients comprising a phenol and an aldehyde. The term "a phenol" is intended to include phenol, and similar materials such as m-cresol, resorcinol, 3,5-xylenol, and mixtures thereof. The aldehyde may be any of the aldehydes which is conventionally used for reactions with phenol to produce A-stage reaction products such as formaldehyde, furfural, mixtures thereof, etc., with formaldehyde being preferred. The ratio of formaldehyde to phenol is preferably in the range of about 1:1 to about 1.6:1, but higher quanities of formaldehyde up to about 3:1 may be used. The resinous material may be prepared by conventional techniques such as those disclosed in U.S. Patents 2,218,373 issued October 15, 1940, and 2,446,429 issued August 3, 1948, but should contain at least about 55% solids.

The most preferred form of phenol aldehyde resin is the partial reaction product of phenol and formaldehyde using a conventional catalyst such as barium hydroxide, the reaction being continued past the phenol-alcohol stage, and the reaction product thereafter dehydrated to a water content not in excess of about 10% by weight, as determined by the Karl Fischer method, and which product is soluble in at least an equal weight of water. The water soluble phenol formaldehyde resins such as those described in U.S. Patents 2,034,457 and 2,190,672 may also be used, preferably dehydrated to the above specified amount. The dehydrated resin products may satisfactorily have a viscosity, at 25° C. in the range of about 600 to about 30,000 cps., but preferably have a viscosity in the range of about 600 to about 10,000 cps. The phenol formaldehyde resins, of the above described type, which are susceptible to degradation by heat above about 75° F. with time, may be used in the fresh condition or may satisfactorily be employed even though they have heat aged from the initial preferred viscosity range to a viscosity in the range of 5,000 cps. to 60,000 but preferably not exceeding about 30,000 cps. Such heat-aged, higher viscosity resins are more difficult to foam, and the formation of lightweight foams from such resins, or mixtures thereof with lower viscosity fresh or partially heat-aged resins requires the use of proportions of volatilizable hydrocarbon and/or wetting agent which approach the upper limits for those components set forth above in Formulation I.

As above stated, the ferric chloride constituent slowly reacts with the aqueous phenol aldehyde resin and causes that mass to foam. The reaction is exothermic and the heat generated is sufficient to cause the phenol aldehyde resin to further polymerize and cure into a self-sustaining cellular material. Both the degree of foam and the quantity of heat which is released are controllable and by regulating the relative proportion thereof, it is possible to formulate compositions which will foam to the necessary degree to fill any pre-determined space. Similarly, by regulating the quantity of ferric chloride and the temperature of mixing the time lapse prior to the initiation of the foaming can be controlled so that a greater or lesser time after mixing and prior to foaming is available for accomplishing the necessary peripheral application steps for the intended use. For example, in the handling of the mixture for application as a surface coating, the pot life period may require lengthening to enable the uniform spreading of the material over the surface, or the non-uniform application to provide varying heights of foamed material at different locations on that surface. The pot life is affected by the quantity of ferric chloride which is added as well as by the vigor of mixing and the temperature attained during mixing. At normal room temperature, i.e., 65° F.–80° F., the pot life of a mixture containing 10–20 parts ferric chloride per 100 parts of aqueous phenol formaldehyde resin is on the order of a minute, which is substantially longer than the pot life of similar phenol formaldehyde resinous masses which are foamed in the presence of a conventional mineral acid catalyst. However, longer pot life is attainable by reducing the amount of ferric chloride and mixing at a controlled lower temperature, e.g., under about 50° F. It has been observed that the foaming rate which results from the admixture of ferric cloride·$6H_2O$ with the above described phenol aldehyde aqueous resinous masses is such that the gas generation continues at an even pace at the interface between the remaining liquid mass and the newly created cellular mass immediately overlying that liquid pool. The cellular structure is such, however, that it is possible to foam the compositions in an open top vessel and create a vertically rising column of material having a substantially exact reproduction of the shape of the vessel in cross section in that rising column for its entire height. Moreover, the height which such a column of foam resinous material achieves is unexpectedly greater than which has heretofore been possible in the foaming of materials from comparable phenol-aldehyde starting ingredients.

As above indicated, the quantity of foam, and the density thereof which can be achieved, is increased when the composition includes a volatilizable hydrocarbon, but as is apparent from an inspection of Formulations I, II and III, only a small quantity of volatilizable hydrocarbon is necessary for that purpose. In the presence of ferric chloride·$6H_2O$ a total quantity of foaming production is obtainable which is equal to that normally obtained from much greater proportions of volatilizable hydrocarbon constituent in combinations similar except for the absence of the ferric chloride constituent.

As above generally indicated, the aluminum chloride constitutent may be present in addition to ferric chloride and confers on the cellular product the property of greatly increasing its flame resistance as well as its resistance to deterioration under sustained elevated temperatures. The aluminum chloride constituent also confers on the cellular product the ability to snuff out or stop flaming, or in other words, enhances the self-extinguishing characteristics of an otherwise similar cellular product except that it does not include the aluminum chloride ingredient.

Although the reason for the enhancement of the flame and heat resistance is not positively known, it is thought that at least part of the aluminum chloride is present in the cellular foamed product in a chemically unchanged form, uniformly distributed throughout the foam, and when a flame is applied to the cellular product the alumminum chloride decomposes to form oxygen excluding gases which serve to prevent the initiation of a flame. Cellular foam containing aluminum chloride in small quantities shows definite improvement in ability to resist initation of flame, and at the preferred concentrations, the cellular product resists flaming even when an oxy-acetylene torch flame is directed on the surface for a short time while somewhat less intense flames, such as propane or butane torch flames, are resisted for extended time periods. When the aluminum chloride is hydrated, evidence is at hand which indicates that the $AlCl_3$ eliminates its water of hydration since it has been observed with certain compositions that droplets of water appear on the surface as the temperature is increased, such as, for example, by the application of a butane or propane torch flame directly to the surface of the cellular material.

The volatilizable hydrocarbon which is suitable for use is an aliphatic ether having a boiling point between about 30° C. and 100° C. which is represented by the formula ROR', wherein R and R' each represent the same or a different alkyl group having up to 4 carbon atoms. Excellent results have also been obtained from the use of methylene chloride as the volatilizable hydrocarbon and it has been found that methylene chloride is somewhat more volatilizable than the aliphatic ethers, volume for volume, and has more power or ability to successfully effect foaming of resinous compositions containing the higher viscosity resinous materials. Methylene chloride produces unexpectedly uniform cellular products and is preferred for use as the volatilizable hydrocarbon in the compositions of this invention. Aliphatic ethers having boiling poitns falling within the above specified range which are specifically suitable for use in the practice of the present invention include isopropyl methyl ether, methyl propyl ether, ethyl propyl ether, ethyl isopropyl ether, diisopropyl ether, di-n-propyl ether, diethyl ether, tertiary butyl ethyl ether, n-butyl ethyl ether, n-butyl methyl ether, and ethyl isobutyl ether. It is permissible to mix the above ethers, and to mix the ethers with methylene chloride and such mixtures are particularly desirable for use in connection with the higher viscosity resins. It has also been noted that the use of the lower boiling point ethers, or mixtures thereof with methylene chloride are most capable of forming lightweight foams from the higher viscosity resins or mixtures thereof. The amount of the volatilizable hydrocarbon which should be employed is dependent both upon the initial viscosity of the phenol aldehyde resin being used and the desired final density of the cellular product. In general, it may be stated that as the viscosity of the resin increases the density of the resulting cellular foam decreases for a given quantity of volatilizable hydrocarbon which is used. As the viscosity of the resin decreases, the quantity of volatilizable hydrocarbon may also be decreased and uniform lightweight foams having a density in the range of about 0.2 to 5 lbs. per cubic foot are satisfactorily formed by using a proportion of volatilizable hydrocarbons in the range of about ½% to 3% by weight of the resin.

The wetting agent functions to assist the formation of uniform pores during foaming and a number of surface active materials have been found to be satisfactory for the purposes of this invention. The surface active agents comprising the polyethylene ethers of sorbitan monoester of a fatty acid containing from 12 to 18 carbon atoms, which are commercially available from Atlas Powder Company under the trademark "Tween," and particularly Tween 40, have been found to be especially satisfactory. Tween 40, the polyethylene ether of sorbitan monopalmitate appears to have the most desirable properties of pore size control for the full range of viscosity of resins which are useful for the purposes of this invention but Tween 20, 21, 60, 61, 65, 80, 81 and 85, which are the polyethylene ethers of specific and different fatty acids containing a number of carbon atoms in the range of from 12 to 18, also specifically produce satisfactory results. The best combination of resin and wetting agent is easily established by a small number of trial batches under the expected operating conditions, once the resin to be used and the desired density has been finalized. In general, the more liquid of these wetting agents at room temperature, such as Tween 20, is preferable for use with the higher viscosity resins since it enables more uniform distribution of the wetting agent throughout the resin during mixing. Similarly, the higher viscosity or thicker wetting agents at room temperature generally produce somewhat better pore size control when used in conjunction with the lower viscosity resins. Other types of wetting agents such as the oleic acid esters of polyethylene glycol of molecular weight in the range of 600–1,500, and the stearic or coconut fatty acid esters of ethylene glycol of molecular weight 400–4,000, may also be used. Other surface active materials known to those skilled in the art to be compatible with phenol aldehyde resins and useful in forming cellular products therefrom may also be used.

It is not necessary that a wetting agent be present in the compositions of this invention as is above indicated by Formulation I, since satisfactory cellular materials are produced, particularly the higher density materials, e.g., heavier than about 30 lbs. per cubic ft., in the complete absence of such a material. It is, however, preferred that a wetting agent by present and a satisfactory quantity thereof is in the range of about 1% to about 4%, by weight of the resin. As the viscosity of the selected resin increases, it is generally desirable to increase the quantity of the wetting agent which is included in the composition, with the maximum indicated quantity of wetting agent being useful with resins having viscosities in excess of about 30,000 cps. Using resins having viscosities in the range of about 2,000 to 5,000 cps., no advantage has been found from the use of quantities of wetting agents exceeding about 4% by weight of the resin, and when employing resins having viscosities in the range of about 600 to about 2,000, about 1% to about 2% of wetting agent, by weight of the resin, is sufficient to produce low density cellular products having uniform pore size.

The improved cellular products of this invention are formed by mixing the ingredients of any one of the Formulations I, II and III, above set forth, on a batch or continuous basis in a suitable container. It is necessary only to insure that all the ingredients are completely intermixed and in this form are ready for application to a surface to be coated, or to a space to be filled. An unusual characteristic of the foaming compositions of this invention is that the rising foam can easily be caused to move laterally and fill all of the available space by merely providing means which places a back pressure on the advancing or rising cellular surface. For example, a floating lid of pre-determined weight is suitable for causing the foam to move laterally in and around reinforcing timbers or metal elements between walls, in, for example, trailers, houses or the like. It has also been found that the compositions of this invention have excellent ability to completely envelope or encapsulate articles to be packaged for transport or shipment and once the appropriate density is selected and the cellular material is cured it usually possesses sufficient strength to resist crushing even heavy articles so packaged. It has been found that by varying the proportion of ferric chloride·6H$_2$O which is present and controlling the temperature of mixing that the pot life of the resulting admixture can be varied from about 1½ to about 7 minutes while still retaining the uniform foaming characteristics of the expanding foam once the foaming process is initiated.

The hydrated form of ferric chloride, namely,

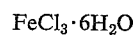

$$FeCl_3 \cdot 6H_2O$$

is the preferred ferric chloride for use in this invention. However, by adjusting the quantities of the volatilizable hydrocarbon, particularly methylene chloride and the wetting agent, and usually by increasing each, it is suitable to employ anhydrous ferric chloride instead of the hydrated ferric chloride.

The below given examples are intended to illustrate in greater detail the method and compositions of this invention, but it is to be understood that the specific proportions, specific materials and conditions employed therein are set forth for illustrative purposes only and do not define the scope or extent thereof which are usable for accomplishing the objectives of this invention, which have been hereinabove set forth.

*Example I*

A cellular material was prepared by admixing in parts by weight, at a temperature of 30° F.–40° F., 100 parts of liquid phenol formaldehyde resin, Bakelite BRL–2759, 2 parts of polyoxyethylene sorbitan monopalmitate (Tween 40) and 6 parts of methylene chloride.

After mixing these materials thoroughly, 20 parts of FeCl$_3$·6H$_2$O was added and intermixed therewith. The mixed material was poured into a large open top cylindrical container and after about 7 minutes, the foaming reaction began and a column of foam rose from the container to a height of about 12" above the top of the container, the side walls of the column being substantially straight and the column having the cross-section of the top of the container from which the cellular material emerged. The cellular material was uniform in texture, had a density of approximately 1 pound/cu. ft. and the top surface was covered with a tough skin; the peripheral surface of the column was slightly green in color, while the inside portion of the foam, observed after cross sectioning the column, was slightly red.

*Example II*

A cellular material was prepared by admixing at about 40° F., 100 parts of liquid phenol formaldehyde resin, Bakelite BRL–2759, 2 parts of polyoxyethylene sorbitan monopalmitate (Tween 40) and 3 parts by weight of methylene chloride. To this mixed material was added, after stirring, 20 parts of FeCl$_3$·6H$_2$O and the mixture stirred to uniformity. This mixture had a pot life of 4 minutes, and after initiation of the foaming, continued to uniformly rise and ultimately produced a column having a total height of 22" above the top of the container. The foam was uniformly textured and had the general appearance of the foam in the column described above in Example I.

*Example III*

A cellular material was prepared by admixing at about 40° F., 100 parts of liquid phenol formaldehyde resin, Bakelite BRL-2759, 2 parts of polyoxyethylene sorbitan monopalmitate (Tween 40) and 3 parts by weight of methylene chloride. To this mixed material was added, after stirring, 10 parts of $FeCl_3 \cdot 6H_2O$ and the mixture stirred to uniformity. This mixture had a pot life of 5½ minutes at the end of which time foam began to slowly rise. The foam was produced slightly more slowly than that resulting from the composition of Example II, the mixed ingredients remaining slightly cooler than those in Example II, but the total height achieved by the column was only slightly lower than the 22" height reached by the column in Example II. The texture and appearance of the foam in the column was substantially similar to that described in Examples I and II.

*Example IV*

A cellular material was prepared by admixing at about 40° F., 100 parts of liquid phenol formaldehyde resin, Bakelite BRL-2759, 2 parts of polyoxyethylene sorbitan monopalmitate (Tween 40), and 6 parts by weight of methylene chloride. To this mixed material was added, after stirring, 10 parts of $FeCl_3 \cdot 6H_2O$ and the mixture was stirred to uniformity. This material had a pot life of approximately 5 minutes and, as the column of foam emerged from the top of the container, there was a slight bulging and drooping outwardly over the rim of the container. As the foam column rose to its ultimate height of approximately 12", the peripheral surface of the column was observed to be rough and uneven and to include a series of bulges which resulted from the momentary lateral drooping of the material as it cleared the top bead of the container. It was also noted that the column shrunk slightly after it achieved its maximum height.

*Example V*

A cellular material was prepared by admixing at 60° F., 100 parts of liquid phenol formaldehyde resin, Bakelite BRL-2759, 2 parts of Tween 40 and 3½ parts of methylene chloride. To this mixed material was added, after stirring, 13 parts of $FeCl_3 \cdot 6H_2O$ and the mixture stirred thoroughly. This mixture had a pot life of about 1½ minutes and with a slow uniform rise reached a height of 41" above the top of the container, the smallest diameter of the vertical column being 5½" and the largest diameter of that column being 7". The foam was uniformly textured, of good structure and had the general appearance of the foam in the column described above in Example I.

Another batch of similarly compounded materials, in the same proportions, was prepared at a mixing temperature of 80° F. The pot life was 45 seconds and the total height reached was 38" with the smallest diameter in the column being 3" and the largest diameter being 8", the top portion of the column being the larger in cross section. The texture of the foam was excellent and it was similar in appearance to that produced at 60° F.

Another batch of the same materials was admixed, using the same proportions and procedures, except that the temperature was 100° F. The pot life of this mixture was 30–45 seconds and the column reached a height of 35" and had an enlarged area at its top having a diameter of 12", while the smaller portion of the vertical column had a diameter of 6". The structure of the foam was uniform and similar in appearance to that produced at 60° F. and 80° F.

What is claimed is:

1. A composition for forming a self-sustaining, cellular product comprising a flowable composition including (1) an aqueous mass of the acid-curing thermosetting liquid product of partial reaction of ingredients including a phenol and an aldehyde, said mass containing at least about 55% by weight of solids, and (2) about 5% to about 35% by weight of said reaction product of ferric chloride $\cdot 6H_2O$.

2. A composition for forming a self-sustaining, cellular product comprising a flowable composition including (1) an aqueous mass of the acid-curing thermosetting liquid product of partial reaction of ingredients including a phenol and an aldehyde, said mass containing at least about 55% by weight of solids, (2) up to about 6% by weight of said reaction product of a volatilizing agent selected from the group consisting of methylene chloride and aliphatic ethers having the formula

ROR′ wherein R and R′ each represent an alkyl group having from 1 to 4 carbon atoms, said aliphatic ether having a boiling point in the range from about 30° C. to about 100° C., (3) about 5 to about 35% by weight of said reaction product of ferric chloride $\cdot 6H_2O$, (4) up to about 100% by weight of said reaction product of aluminum chloride, and (5) up to about 10% by weight of said reaction product of a compatible wetting agent.

3. A composition for forming a self-sustaining cellular product comprising a flowable composition including (1) an aqueous mass of the acid-curing thermosetting liquid product of partial reaction of ingredients including a phenol and an aldehyde, said mass containing at least about 55% by weight of solids, (2) from about 2% to about 6% by weight of said reaction product of a volatilizing agent selected from the group consisting of methylene chloride and aliphatic ethers having the formula

ROR′ wherein R and R′ each represent an alkyl group having from 1 to 4 carbon atoms, said aliphatic ether having a boiling point in the range from about 30° C. to about 100° C., (3) about 8% to about 15% by weight of said reaction product of ferric chloride $\cdot 6H_2O$, (4) about 15% to about 50% by weight of said reaction product of aluminum chloride, and (5) about 1% to about 4% by weight of said reaction product of a compatible wetting agent.

4. A composition for forming a self-sustaining, cellular product comprising a flowable composition including (1) an aqueous mass of the acid-curing thermosetting liquid product of partial reaction of ingredients including a phenol and an aldehyde, said mass containing at least about 55% by weight of solids, (2) about 3% by weight of said reaction product of a volatilizing agent selected from the group consisting of methylene chloride and aliphatic ethers having the formula

ROR′ wherein R and R′ each represent an alkyl group having from 1 to 4 carbon atoms, said aliphatic ether having a boiling point in the range from 30° C. to about 100° C., (3) about 13% by weight of said reaction product of ferric chloride $\cdot 6H_2O$, (4) about 20% by weight of said reaction product of aluminum chloride, and (5) about 2% by weight of said reaction product of a compatible wetting agent.

5. A composition in accordance with claim 3 wherein said volatilizable hydrocarbon is methylene chloride.

6. A composition in accordance with claim 3 wherein said reaction product contains at least about 75% by weight of solids, said volatilizing agent is methylene chloride and said wetting agent is the polyethylene ether of sorbitan monopalmitate.

7. A method of forming a self-sustaining cellular product which comprises the steps of (1) forming an aqueous mass of acid curing thermosetting liquid condensation product by the partial reaction of ingredients, including a phenol and an aldehyde, said condensation product having been reacted to a least the phenol alcohol stage and containing at least about 55% by weight of solids, (2) and mixing with said condensation product about 5% to about 35% by weight thereof of ferric chloride·6H₂O, (3) and maintaining said mixed ingredients in a receptacle at atmospheric pressure to thereby produce a foamed cellular product.

8. A method of forming a self-sustaining cellular product which comprises the steps of (1) forming an aqueous mass of acid-curing thermosetting liquid condensation product by the partial reaction of ingredients, including a phenol and an aldehyde, said condensation product having been reacted to at least the phenol alcohol stage and containing at least about 55% by weight of solids, (2) mixing with said condensation product up to about 6% by weight of said reaction product of a volatilizing agent selected from the group consisting of methylene chloride and aliphatic ethers having the formula

ROR' wherein R and R' each represent an alkyl group having from 1 to 4 carbon atoms, said aliphatic ether having a boiling point in the range from about 30° C. to about 100° C., (3) about 5 to about 35% by weight of said reaction product of ferric chloride·6H₂O, (4) up to about 100% by weight of said reaction product of aluminum chloride, (5) up to about 10% by weight of said reaction product of a compatible wetting agent, and (6) maintaining said mixed ingredients in a receptacle at atmospheric pressure to thereby produce a foamed cellular product.

9. A method of forming a self-sustaining cellular product which comprises the steps of (1) forming an aqueous mass of acid-curing thermosetting liquid condensation product by the partial reaction of ingerdients, including a phenol and an aldehyde, said condensation product having been reacted to at least the phenol alcohol stage and containing at least about 55% by weight of solids, (2) mixing with said condensation product from about 2% to about 6% by weight of said reaction product of a volatilizing agent selected from the group consisting of methylene chloride and aliphatic ethers having the formula

ROR' wherein R and R' each represent an alkyl group having from 1 to 4 carbon atoms, said aliphatic ether having a boiling point in the range from about 30° C. to about 100° C., (3) about 8% to about 15% by weight of said reaction product of ferric chloride·6H₂O, (4) about 15% to about 50% by weight of said reaction product of aluminum chloride, (5) about 1% to about 4% by weight of said reaction product of a compatible wetting agent, and (6) maintaining said mixed ingredients in a receptacle at atmospheric pressure to thereby produce a foamed cellular product.

10. A method of forming a self-sustaining cellular product which comprises the steps of (1) forming an aqueous mass of acid-curing thermosetting liquid condensation product by the partial reaction of ingredients, including a phenol and an aldehyde, said condensation product having been reacted to at least the phenol alcohol stage and containing at least about 55% by weight of solids, (2) mixing with said condensation product about 3% by weight of said reaction product of a volatilizing agent selected from the group consisting of methylene chloride and aliphatic ethers having the formula

ROR' wherein R and R' each represent an alkyl group having from 1 to 4 carbon atoms, said aliphatic ether having a boiling point in the range from 30° C. to about 100° C., (3) about 13% by weight of said reaction product of ferric chloride·6H₂O, (4) about 20% by weight of said reaction product of aluminum chloride, (5) about 2% by weight of said reaction product of a compatible wetting agent, and (6) maintaining said mixed ingredients in a receptacle at atmospheric pressure to thereby produce a foamed cellular product.

11. A method in accordance with claim 9 wherein said volatilizable hydrocarbon is methylene chloride.

12. A method in accordance with claim 9 wherein said reaction product contains at least about 75% by weight of solids, said volatilizing agent is methylene chloride and said wetting agent is the polyethylene ether of sorbitan monopalmitate.

References Cited by the Examiner

UNITED STATES PATENTS

| | | | |
|---|---|---|---|
| 2,911,382 | 11/1959 | Barkhuff et al. | 260—2.5 |
| 2,933,461 | 4/1960 | Mullen | 260—2.5 |

FOREIGN PATENTS

| | | |
|---|---|---|
| 903,564 | 8/1962 | Great Britain. |

MURRAY TILLMAN, *Primary Examiner.*

M. FOELAK, *Assistant Examiner.*